Jan. 2, 1940.  W. E. HUBBARD  2,185,917
SPLIT CRANK BEARING
Filed Jan. 24, 1939

INVENTOR
*William E. Hubbard*
BY *Barry & Cyr*
ATTORNEYS

Patented Jan. 2, 1940

2,185,917

UNITED STATES PATENT OFFICE 2,185,917

SPLIT CRANK BEARING

William E. Hubbard, Tulsa, Okla., assignor to Hydraulic Pumper Incorporated, Tulsa, Okla., a corporation of Oklahoma Application January 24, 1939, Serial No. 252,683

5 Claims. (Cl. 74—580)

This invention relates to an improvement in the connecting rods of engines with radially arranged cylinders, and more particularly concerns the mounting of the master bearing on the crank shaft of the engine.

An important object of this invention is to provide a split bearing structure provided with apertures for receiving connecting bolts disposed in proximity of the center of the bearing structure to provide maximum tightness between the split bearing and the crank pin whereby the bending moment of the pin is decreased.

And still a further object of this invention is to provide a split bearing structure surrounding a crank pin and having a plurality of apertures of varying radii from the axis of the crank pin to provide means for the disposition of longer and shorter connecting rods around the bearing.

And still another important object of this invention is to provide a split crank bearing for radial engines of such construction that is more compact providing a strong structure of less weight, and consequently less expensive.

Other objects and advantages of my invention will be evident from the following detailed description read in conjunction with the accompanying drawing which illustrates one form of my new invention.

Figure 1:
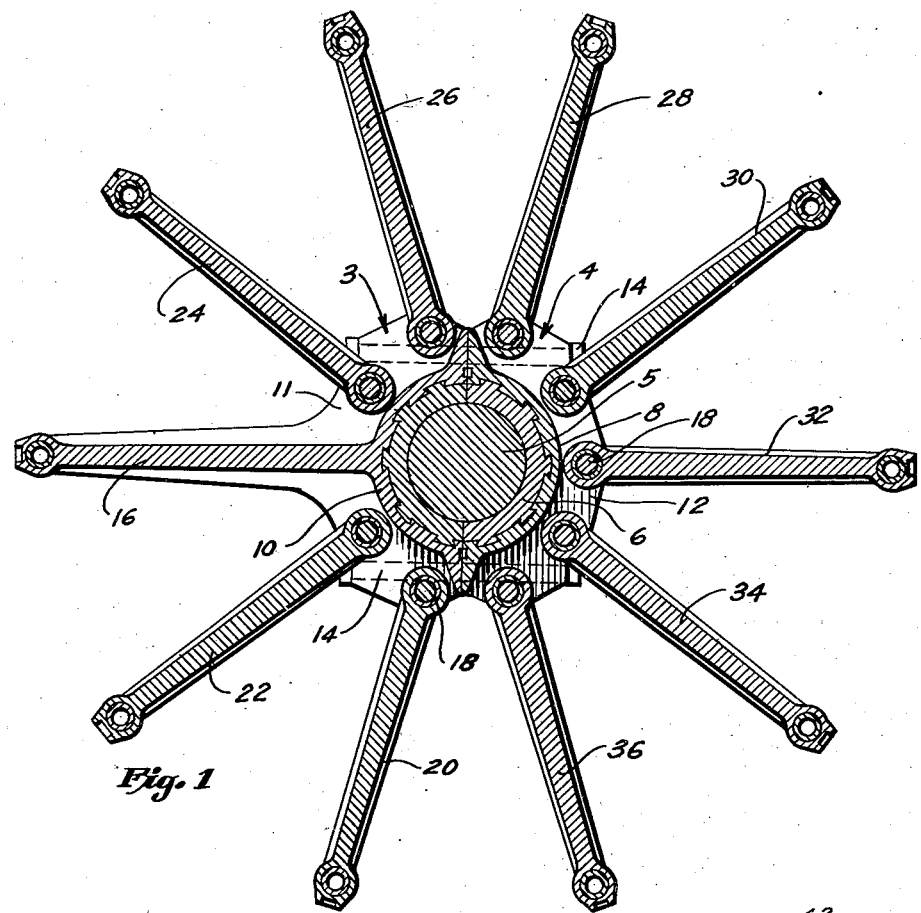
Fig. 1 is a vertical sectional view of the improved split bearing structure and connecting rod assembly.

Referring to the drawing in detail and more particularly Fig. 1. The split main rod bearing 2 comprises a pair of semi-circular sections 3 and 4 disposed on a crank pin 5. Interposed between the crank pin 5 and the bearing sections 3 and 4 is a babbitted split bearing sleeve or liner 6, dovetailed to the half sleeves 8 and 10 of the main bearing.

The split sleeve is provided with a pair of complementary outwardly extending spaced flanges 11 and 12, the flanges of the two sections being detachably connected together by bolts 14. Four bolts are preferred, arranged in parallel relation, two at each side of the crank pin 5 in order to hold the sections 3 and 4 together. A main connecting rod 16 is integrally cast and rigid with the bearing section 3, and the flanges 11 of the latter are preferably provided with apertures to receive pins 18 employed in pivotally connecting pitmans 20, 22, 24 and 26 to the section 3. The complementary section 4 also has its flanges 12 provided with apertures to receive the pins 18 which pivotally connect connecting rods 28, 30, 32, 34 and 36 to the section 4.

Figure 2:
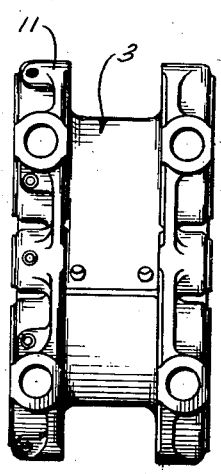
Fig. 2 is a top view of the improved bearing structure with the connecting rods removed.
Figure 3:
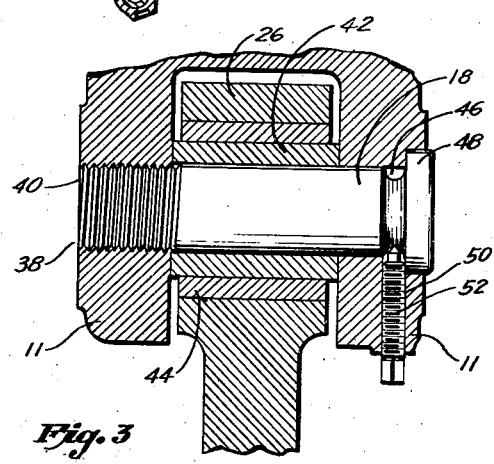
Fig. 3 is a detail vertical sectional view of the threaded stud for securing the rods to the bearing.

It will be understood that all the connecting rods except the master rod 16, are secured to their respective bearing sections 3 and 4 in an identical manner, and in view of this, only one will be considered, as shown in detail in Fig. 2. The complementary rods are disposed between the spaced flanges 11 and 12 and secured thereto by the pin 18. The pin is provided with threads 38 cooperating with the complementary threads 40 provided in one of the complementary spaced flanges. Interposed between the connecting rods and the pin 18 is a conventional bushing 42, complementary to a bushing 44 provided in the rods. An annular groove 46 is provided below the head 48 of the pin 18, and the flanges are provided with an aperture 50 for the reception of a set screw 52 cooperating with the groove 46 to assist the locking engagement of the pin 18. It will be understood that the bushing 42 is held tight between the spaced flanges by the locking engagement of the pin 18.

The particular novelty of this construction is the split bearing providing two sections in order that the crank pin may be made integral with the crank shaft (not shown).

As previously mentioned the two sections 3 and 4 are held in place by a plurality of bolts 14. It will be obvious that if all the connecting rods were of the same length, there would be no space provided to allow passage of the coupling bolts securing the two sections 3 and 4 together. In order to provide space for the coupling bolts 14, some of the apertures for the pins 18 are positioned nearer the axis of the crank pin 5 than the remaining apertures. As will be apparent from Fig. 1 the apertures for the studs or pins 18 of the connecting rods 20, 26, 28 and 36 are closer to the axis of the pin 5 than are the remaining apertures for the studs of the connecting rods 22, 24, 30, 32 and 34. With this arrangement, the bolts 14 may readily pass through the flanges. However, it is to be noted that the overall radii of all the connecting rods from the axis of the crank pin 5 is equal. This is done by merely shortening the length of rods 20, 26, 28 and 36 to correspond to the amount of space allowed for passage of the bolts. It will be apparent that with this construction there are four short and six long connecting rods.

Changes may be made in the combination and arrangement of parts as heretofore set forth in the specification and shown in the drawing, it being understood that any modification in the precise embodiment of the invention may be made within the scope of the following claims without departing from the spirit of the invention.

What I claim is:

1. In combination with a crank shaft having a crank pin, a master connecting rod having split bearings surrounding said pin, means for securing the bearings together, said bearings provided with complementary spaced flanges extending perpendicular to the longitudinal axis of the pin, a plurality of studs connecting the flanges, a plurality of secondary connecting rods secured to the studs, part of said studs disposed in the flanges nearer to the longitudinal axis of the crank pin than the remaining studs.

2. In combination with a crank shaft having a crank pin, a master connecting rod having split bearings surrounding said pin, said bearings provided with complementary spaced flanges extending perpendicular to the longitudinal axis of the pin, a plurality of studs connecting the flanges, a plurality of secondary connecting rods secured to the studs, part of said studs disposed in the flanges nearer the longitudinal axis of the crank pin than the remaining studs, and means for securing the bearings together, said means passing through portions of the bearings arranged between the crank pin and studs which are disposed furthest from the longitudinal axis of the crank pin.

3. In combination with a crank shaft having a crank pin, a master connecting rod having split bearings arranged around said pin, a plurality of bolts extending through the bearings for securing the bearings together, said bearings provided with complementary spaced flanges extending perpendicularly to the longitudinally axis of the pin, a plurality of studs connecting the flanges, a plurality of secondary connecting rods secured to the studs, part of said studs disposed in the flanges nearer the longitudinal axis of the crank pin than the remaining studs, part of said secondary connecting rods being of greater length than the remaining secondary connecting rods, all of said rods having wrist pin openings at their outer ends, said openings being equidistant from the longitudinal axis of the crank pin.

4. In combination with a crank shaft having a crank pin, a master connecting rod having split bearings arranged around said pin, said bearings provided with complementary spaced flanges extending perpendicularly to the longitudinal axis of the pin, a plurality of studs connecting the flanges, a plurality of secondary connecting rods secured to the studs, part of said studs disposed in the flanges nearer the longitudinal axis of the crank pin than the remaining studs, all of said rods having wrist pin openings at their outer ends, said openings being equidistant from the longitudinal axis of the crank pin, and bolts passing through portions of the bearings arranged between the crank pin and studs which are disposed furthest from the longitudinal axis of the crank pin.

5. In combination with a crank shaft having a crank pin, a master connecting rod having split bearings arranged around said pin, a plurality of bolts extending through the bearings for securing the bearings together, said bearings provided with a pair of complementary spaced flanges extending perpendicular to the longitudinal axis of the crank pin, a plurality of secondary connecting rods secured to the flanges, part of said secondary connecting rods secured to the flanges at a position farther from the longitudinal axis of the crank pin than the remaining secondary rods, to provide passageway for the bolts securing the bearings together.

WILLIAM E. HUBBARD.